United States Patent [19]

Sturm

[11] 4,371,282
[45] Feb. 1, 1983

[54] SLEEVE FOR CONNECTING A HANDLE TO A TOOL

[75] Inventor: Bernd Sturm, Reichelsheim, Fed. Rep. of Germany

[73] Assignee: Coronet-Metallwarenfabrik GmbH, Wald-Michelbach, Fed. Rep. of Germany

[21] Appl. No.: 185,897

[22] Filed: Sep. 10, 1980

[30] Foreign Application Priority Data

Sep. 20, 1979 [DE] Fed. Rep. of Germany ....... 2937967

[51] Int. Cl.³ ............................................. B25G 3/28
[52] U.S. Cl. .................................. 403/277; 403/299;
403/248; 15/145; 16/114 R
[58] Field of Search ............... 403/299, 282, 343, 277, 403/248; 15/145; 16/114 R

[56] References Cited

U.S. PATENT DOCUMENTS 1,765,651  6/1930  Bryant ................................ 403/282
3,900,220  8/1975  Buchser ......................... 403/299 X
4,003,668  1/1977  Kelly ............................. 403/299 X

FOREIGN PATENT DOCUMENTS 7503826  6/1975  Fed. Rep. of Germany .
2330165  8/1976  Fed. Rep. of Germany .
151258  2/1932  Switzerland ....................... 403/299

Primary Examiner—Andrew V. Kundrat
Attorney, Agent, or Firm—Sandler & Greenblum

[57] ABSTRACT

A conical sleeve with a male screw thread for fixing a length of tube as a handle to a broom head has inner ridges sloping towards the axis of the sleeve as they get nearer the narrower end of the sleeve. On driving the length of tube into the sleeve, grooves are folded inwards by the ridges. At their ends nearest the narrower end of the sleeve, the ridges have radial faces, over which the end of the tube is bent and splayed for producing a strong locking action and stopping any twisting of the tube in relation to the sleeve.

13 Claims, 6 Drawing Figures

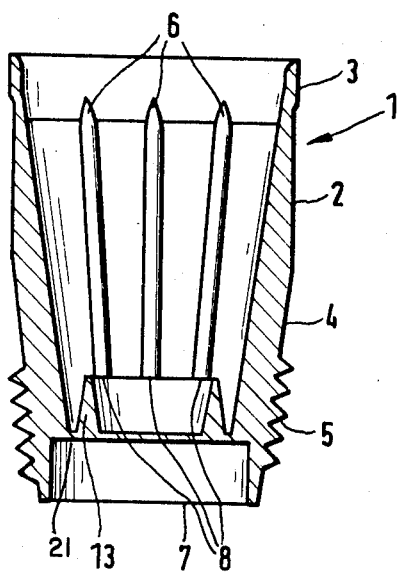
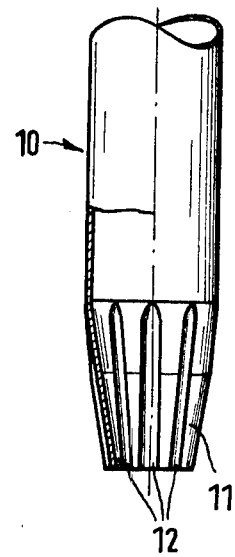
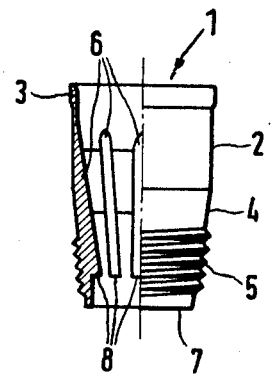
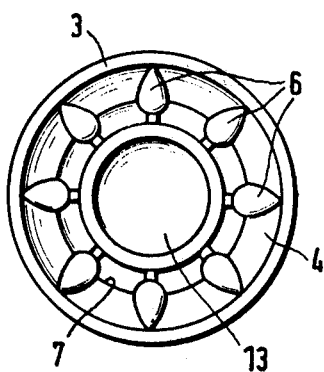
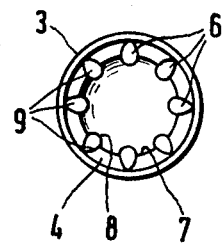
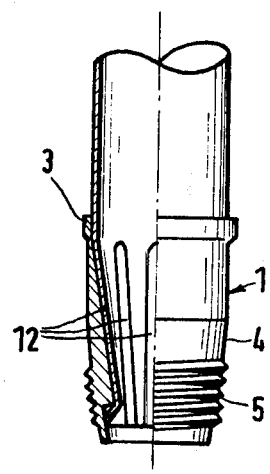

SLEEVE FOR CONNECTING A HANDLE TO A TOOL

BACKGROUND OF THE INVENTION (i) Field to which the invention relates

The invention relates to a handle of round tube for home utensils, more specially brooms, with a threaded sleeve, whose conical threaded hollow male endpiece is screwed into the utensil, for example a broom head, and on the inside is made uneven for locking onto the handle end.

(ii) The prior art

Handles for home utensils, made of steel or aluminum tube, are used in a great number of different forms and for different purposes. Threaded sleeves used in this respect for screwing the handle in position generally have a cylindrical or hollow conical endpiece, in which the cylindrical handle, or its conical endpiece, is simply forced and kept in position by friction. In the case of such male threaded sleeves of synthetic resin or metal, the utensil handle is not generally locked or gripped in position strongly enough and it is quite likely for the broom head to become loose and be dropped off on sweeping.

For making a better form of this connection there has been a suggestion (see German Pat. No. 2,330,165) to make the endpiece of great length and for it to be wedged on the tube by using a male conical element. Such a wedging operation is, however, only possible in the case of a welded or seamless tube. Furthermore, on driving the conical element into the tube, the last-named is bent and becomes unsightly. In the case of other fixing systems, a synthetic resin or metal male threaded sleeve is united with the steel or aluminum handle by nailing using staple nails, which, however, are quite likely to become loose and on shaking may come out of the handle completely.

In a further design on these general lines (see the German Gebrauchsmuster Pat. No. 7,503,826), the hollow conical endpiece of the handle has asymmetrical, pressed-in grooves for taking up opposite ridges of the male threaded sleeve. After pushing the handle into position, the grooves are forced up against the ridges, this stopping any twisting of the handle. Furthermore, from the open end, a plug is forced into the threaded sleeve, the plug having an uneven form for producing a locking effect. A shortcoming in this design is the great number of separate parts, the need to keep to certain, narrow tolerances between the tube handle and the threaded sleeve and the need for carefully putting the threaded sleeve and handle in line with each other on fixing them together.

SHORT OUTLINE OF THE INVENTION

Taking as a starting point a handle fixing or attaching system as described above, one purpose of the invention is to provide a system in which the sleeve and handle themselves include all parts necessary to provide the fixing function and in which after the handle has been inserted into the sleeve, no further operations are needed to provide the fixing function.

In the case of a handle and screw threaded sleeve of the sort noted, this and other purposes are effected in the invention because the sleeve has an inner face in its conical end part with the male thread, and furthermore inwardly running projections on the said inner face, said projecting stretching lengthwise of the sleeve from points on its inner face some distance short of its broader end to nosepieces inside the rest of the inner face of the sleeve at a distance short of the narrower end of the sleeve, the projections being nearer the center axis of the sleeve at its narrower than at its broader end, one end of the handle, which is to be fixed to the sleeve, having a smooth wall.

The wording "smooth-wall" is used in this respect to make it clear that the handle does not, before fixing, have an uneven form answering to the inner uneven form of the threaded sleeve. In the case of the handle of the invention, the threaded sleeve having the teeth on its inside face is, as well, used as a tool for forming the corresponding indentations in the smooth-walled tube part which is to be moved into the sleeve in an axial manner by steady force or by hammering. More specifically, it is not necessary for the end of the handle to have been grooved beforehand and, as described above, the projecting teeth on the inside face of the sleeve form indentations in the handle during the insertion process. Furthermore, the utensil handle is seated much more lastingly and reliably than in the prior art for stopping any twisting of the handle within the sleeve. The threaded sleeve of the invention may, with good effect, furthermore be used more specially for utensil handles of round tube, which do not have a hollow-conical endpiece. In this case, the endpiece is not only grooved by way of the ridges on the threaded sleeve, but furthermore it is so folded inwards that the hollow-conical form of the endpiece is produced at the same time. To this degree, the invention furthermore makes it possible for one less working step to be used on producing home utensils. Furthermore, on fixing the handle and the threaded sleeve together, no centering or lining-up operation is necessary.

Taking a general view, it may be seen that the invention is responsible for a markedly better design with respect to stopping damage by twisting and pulling forces, while the price of producing such a fixing system becomes lower. Furthermore, the loss of form of the end of the handle is not in the part which may be seen so that, from the point of view of taste and a neat design, a clear step forward has been made.

The projections may have any desired form, for example in the form of ridges or as a bead-like ring with gaps, as humps with a rounded outline or the like, the most important point being that such projections or the like are placed sloping inwards towards the axis of the sleeve as they get nearer its narrower end and, for this reason, make it possible for the end of the handle to be readily pushed in and formed.

In a preferred form of the invention, the handle, pushed into the threaded sleeve, has its end sticking out further to the front past the nosepieces, its full outer edge being bent over against the nosepieces at this position. Because of this design, the handle is safely fixed and tightly locked against pulling forces, without using any inner plug or the like. Furthermore, the outer form of the handle and of the threaded sleeve is not damaged in any way.

In one working example with a further development of the invention, the hollow-conical endpiece of the threaded sleeve is made longer in an upward direction in the form of a cylindrical part, of the same cross-section as the top edge of the endpiece or of the handle, for truly axially guiding the utensil handle on driving it into position and making certain that it is neatly slipped into the threaded sleeve so that the utensil handle is truly lined up with the utensil, with which it is to be used.

In the case of the working example noted, it is best for the projections, for example in the form of ridges, to be designed stretching along lines generating the inner general outline of the conical part of the threaded sleeve into the cylindrical part, and running into its general outline face smoothly. The number of ridges is to be at least three, although six to eight is a better number to make quite certain of a good seat of the handle in position.

In a further development of the invention, the male threaded sleeve has at the lower edge a male plug joined up with the lower edge in one piece by way of narrow bridgepieces, the plug being used for splaying out the formed end of the tube handle. This measure makes it possible to make certain that on putting in the handle, its end, which goes out further than the nosepieces of the ridges in a forward direction, is forced back in an outward direction over and on to these nosepieces. This way of fixing the handle in position makes certain of a strong seat in, and join with the utensil of the handle and even if the utensil is used roughly for years on end. There is no chance of the handle's becoming loose. Naturally this further fixing effect may be produced by pushing out the material of the handle end in the case of a threaded sleeve without its own plug, by using a hand splaying tool or by powered mechanical, pneumatic or hydraulic splaying apparatus, as has been noted earlier in connection with bending over the edge of the end of the handle.

The threaded sleeve of the present invention may be made of any strong enough material, more specially metal. Because of the relatively high forces which it has to take up, it is best made as an aluminum or zinc pressure casting.

The threaded sleeve of the present invention may furthermore be made of a strong enough synthetic resin, in which respect it is best for the handle to be given a conical form at one end before driving it in position. The handle end may be grooved before running it into the sleeve.

LIST OF FIGURES

An account will now be given of two working examples of the handle of the present invention with a threaded sleeve, so as to make clear further details and useful effects of the invention.

FIG. 1 is a view from the side of a threaded sleeve in a simple design form, parts being broken away.

FIG. 2 is an end-on view of the sleeve of FIG. 1.

FIG. 3 is a view of the partly broken-away lower end of an utensil handle of metal tube in the formed condition as produced by running it into the threaded sleeve by force or by hammering, as seen in side-view.

FIG. 4 is a side-view, one half being in section, of a threaded sleeve with the handle in position, the handle being partly broken away.

FIG. 5 is a upright section through a threaded sleeve in the form of a different design, on a greater scale.

FIG. 6 is a view of the sleeve of FIG. 5 as seen from above.

DETAILED ACCOUNT OF WORKING EXAMPLES OF THE INVENTION

As will be seen from FIG. 1, the sleeve with a male thread and in the form of an aluminum or zinc pressure casting, generally referenced 1, is made up of a top cylindrical part 2 with a top edge bead 3 running right the way round the sleeve, and a lower hollow-conical part 4, which has the male thread 5 and, on the inner side, has axially running teeth in the form of ridges 6 on the inner conical face, which are regularly spaced and concentric. Ridges 6 are of generally half round to triangular cross-section with a rounded-off inner edge. In the present example, there are eight such ridges, the ridges starting a small distance of about 5 millimeters from the lower edge 7 of the male-threaded sleeve, as sharp, angled nosepieces 8 while their inner edge 9, running lengthways, is parallel to the generatrix of the conical inner face of the cylindrical part 2, with which they are smoothly merged and come to an end. Naturally, it would readily be possible for the ridges to be designed with a certain slope of their inner lengthways edge 9 in relation to the conical inner face, so that, dependent on the size and slope, the ridges would be greater or less in length than is the case with the present working example in view. From the end-on view of FIG. 2, the number and placing of the ridges will be clear and it will furthermore be seen from the figure that their lower sharp ends are designed sticking pointedly inwards into the free space. The end faces are generally radial.

On forcefully driving a seamless, overlapped or welded metal tube as an utensil handle 10 (FIG. 3) into the male screw threaded sleeve 1, for example by hammering, its end part 11 will be formed and inwardly folded by the cast sleeve 1 with its ridges 6, and more specially their lower sharp ends 8, or by a tool of the same inner form as the sleeve, grooves 12 of the same form as the ridges 6 being produced for locking the handle 10 against turning in relation to the sleeve. Because of the elastic properties of the material, the lower edge part of the handle 10 at the lower end of the folded-in grooves 12 under the sharp ends 8 of ridges 6 will be forced outwards automatically somewhat to be overlapping the nosepieces so that, because of this, the handle will be locked axially and not be able to be pulled out of position. It is, however, naturally better for the material to be bent outwards later (after driving home the handle 10) by working with a splaying tool.

FIGS. 5 and 6 are a view of one working example of the invention in which splaying is caused by a hollow-conical element 13, formed as part of the casting of the screw-in sleeve at its end, and running out into the space inside the sleeve.

I claim:

1. A hollow sleeve for connecting a round tubular handle originally configured smooth on one end to a tool comprising:
   (a) a conical end part having outside threading for engaging the tool; and
   (b) a profiling on the inside face of the sleeve for fixing the end of the handle, the profiling including inward projections arranged in a star-shape and rising out of the inside face of the sleeve at a distance from the larger edge of the sleeve at a distance from the larger edge of the sleeve to a distance from a smaller bottom edge in a continuous slope until ending to form nosepieces which project out of the inside face of the sleeve,
   whereby when the handle is fully inserted into the sleeve, the projections form indentations in the originally smooth end of the handle, and the end of the handle projects into the sleeve beyond the nosepieces and is splayed on its entire periphery against the nosepieces.

2. The sleeve as claimed in claim 1, wherein the projections are ridges.

3. The sleeve as claimed in claim 1, wherein the projections take the form of a bead-like ring having gaps therein.

4. The sleeve as claimed in claim 1, wherein the projections are hump-like with a rounded outline.

5. The sleeve as claimed in any one of claims 1, 2, 3 or 4, wherein the sleeve has a conical end part which has a cylindrical part at its broader end, whose inner diameter is equal in cross-section to the broader end.

6. The sleeve as claimed in claim 1 wherein the projections of the sleeve are designed running along generatrices of the inner conical face, interrupted by the projections, of the conical part as far as the cylindrical part, where they come to an end smoothly on an inner face of the cylindrical part.

7. The sleeve as claimed in claim 6 having at least three, and more specially six to eight projections.

8. The sleeve as claimed in claim 7 wherein the sleeve has at its narrower end a male plug, joined with it by bridge pieces, for splaying out the end of the handle next to the nosepieces of the projections.

9. The sleeve as claimed in claim 8 wherein the sleeve is made of metal, preferably in the form of aluminum or zinc pressure casting.

10. The sleeve as claimed in claim 9 wherein the sleeve is a synthetic resin molding.

11. The sleeve as claimed in claim 10 in which the handle has a hollow conical end, formed before placing it in the sleeve.

12. The sleeve as claimed in claim 8 wherein the male plug has a conical outer surface and is adapted to splay the end of the handle beneath the nosepieces.

13. The sleeve as claimed in claim 12 wherein the male plug is disposed such that at least part of its conical outer surface is beneath the nosepieces.

* * * * *

UNITED STATES PATENT AND TRADEMARK OFFICE
CERTIFICATE OF CORRECTION

PATENT NO. : 4,371,282

DATED : February 1, 1983

INVENTOR(S) : Bernd STURM

It is certified that error appears in the above-identified patent and that said Letters Patent is hereby corrected as shown below:

Column 4, lines 59-60, after "face" delete --- of the sleeve at a distance from the larger edge ---.

Signed and Sealed this

Sixth Day of September 1983

[SEAL]

Attest:

GERALD J. MOSSINGHOFF

Attesting Officer     Commissioner of Patents and Trademarks